Patented July 11, 1933

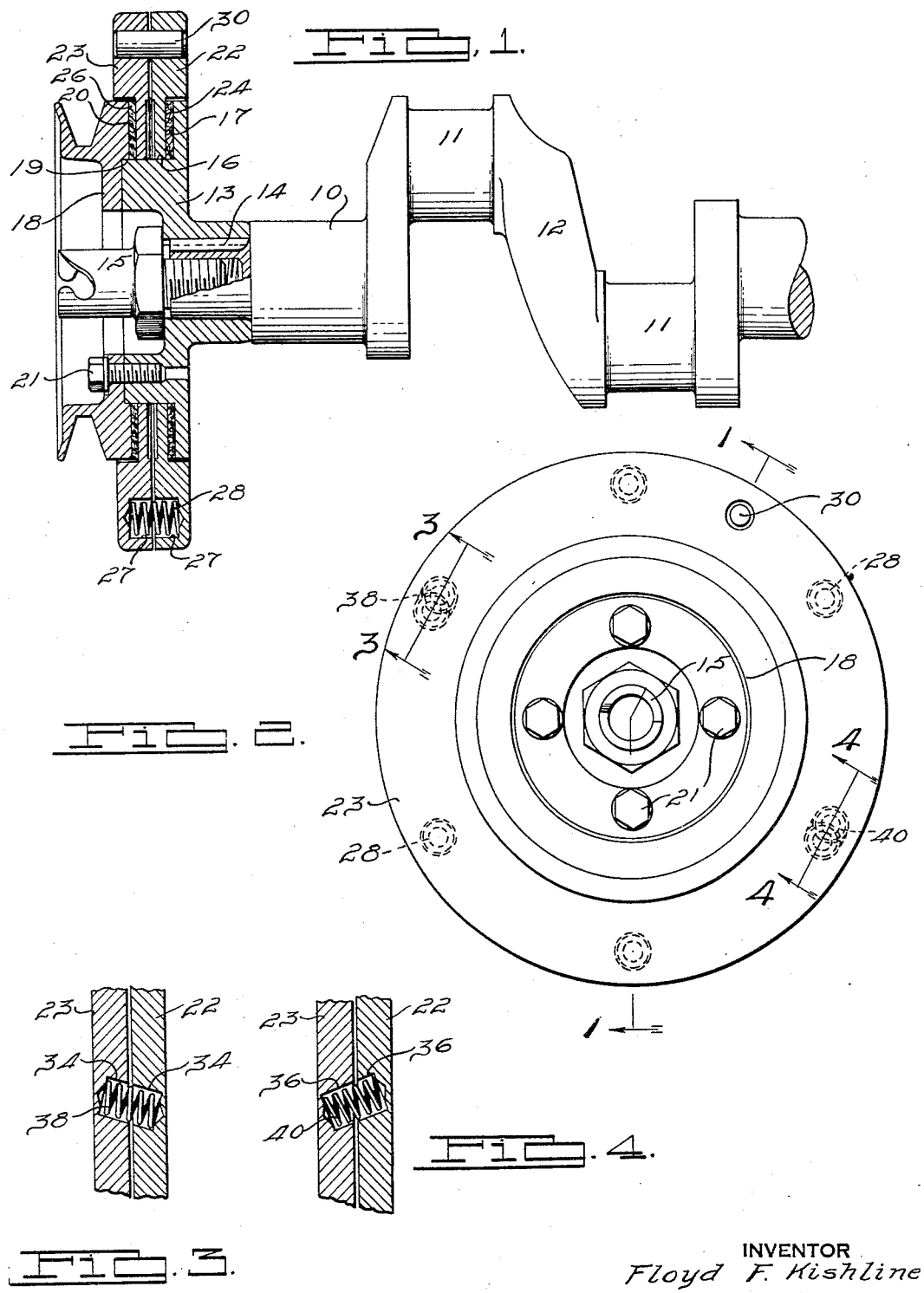

1,917,650

UNITED STATES PATENT OFFICE

FLOYD F. KISHLINE, OF DETROIT, MICHIGAN, ASSIGNOR TO GRAHAM-PAIGE MOTORS CORPORATION, A CORPORATION OF MICHIGAN

VIBRATION DAMPER

Application filed September 2, 1932. Serial No. 631,528.

This invention relates to vibration dampers and particularly such dampers as are employed for damping out the torsional vibrations in the crankshafts of engines of automobiles and the like, the principal object being the provision of a construction which will permit relatively great manufacturing tolerances in the parts thereof without danger of setting up rattles or other objectional noises during operation thereof, together with certain economies in the production of such dampers which result therefrom.

Another object is the provision of a vibration damper construction in which means are provided to cause the major parts thereof to resiliently grip the member upon which they are supported, regardless of the clearance between them and such supporting member.

Another object is the provision of resilient means in connection with certain major parts of a vibration damper tending to eccentrically displace such members whereby to cause the members to resiliently grip the member upon which they are supported.

Another object is the provision of a vibration damper including a pair of mass elements frictionally urged towards equal rotation with the crankshaft upon which they are mounted, the mass elements being pivotally connected together eccentrically of the crankshaft and resiliently urged in opposite directions of rotation with respect to the pivotal connections whereby to cause them to resiliently grip the crankshaft upon which they are supported.

Further objects are to provide a vibration damper that is simple in construction and will remain efficient and noiseless in operation regardless of wide manufacturing tolerances permitted in the construction of the same.

The above being among the objects of the present invention the same consists in certain features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Figure 1 is a fragmentary, partially broken, side elevational view of a crankshaft for an internal combustion engine having a vibration damper constructed in accordance with the present invention, mounted thereon, the vibration damper being shown in vertical section taken centrally through the same as on the line 1—1 of Fig. 2.

Fig. 2 is an end elevational view of the vibration damper and crankshaft shown in Fig. 1, taken from the left hand end of the construction shown in Fig. 1.

Figs. 3 and 4 are fragmentary sectional views taken respectively on the lines 3—3 and 4—4 of Fig. 2.

As is commonly known in the art, crankshafts, and particularly crankshafts for internal combustion engines employed in connection with automobiles, are subjected to certain twisting or torsional forces during operation of the engine which tend and actually do twist the crankshaft about its axis during operation. At certain speeds of the engine the frequency of power impulses in the various cylinders, or a harmonic thereof, and which are transmitted to the crank shaft, falls in phase with the natural period of torsional vibration of the crankshaft which then tends to cause a marked torsional vibration of the crankshaft with all of the attendant undesirable vibrations and other effects.

In order to prevent the crank shaft from torsionally vibrating in sympathy with the power impulses in the engine it is customary, in present day practice, to provide some means for dampening out torsional vibrations of the crankshaft and such means commonly include a mass rotatably associated with the crankshaft and frictionally urged towards equal rotation therewith, the friction means being such that upon the occurrence of torsional vibrations in the crankshaft the mass is caused to have a slight relative movement with respect to the crankshaft, and such relative movement being resisted by the friction means previously mentioned, the energy tending to cause the torsional vibrations is absorbed by the friction means and dissipated into heat, and as a result such torsional vibrations are prevented from becoming apparent in the operation of the engine.

In one type of torsional vibration damper the crankshaft is provided with a pair of axially spaced radially extending shoulders between which is provided a cylindrical surface upon which two disc-like mass or weight members are rotatably supported. Friction material is provided between these members and their corresponding shoulders and resilient means are provided between the two mass members to separate them, whereby to frictionally lock the mass members to the shoulders for equal rotation with the crankshaft. It is to this type of vibration damper that the present invention relates in particular. In this type of vibration damper it has been found that the fit between the mass elements and the cylindrical surface upon which they are centered between the shoulders on the crankshaft must be maintained with extreme accuracy or a rattling sound will be produced between the weight members and the centering surface in operation. In fact, it has been found that this fit must be maintained with such accuracy that the cost of producing these parts has become entirely out of proportion to the production of apparently equivalent accurately machined parts even with present day machinery and, accordingly, it is the primary object of the present invention to provide a construction by means of which the accuracy in the fit between the various parts of the above mentioned type of vibration dampers may be greatly eliminated and without the possibility of any rattling developing in the vibration damper in service, or adversely affecting the vibration damping effects thereof.

Referring to the accompanying drawing, a typical crankshaft for an internal combustion engine is indicated at 10, it being provided with a plurality of crank pins 11 connected together by the usual throws 12. In accordance with conventional practice one end of the crank shaft 10 is provided with a flange like member 13 keyed thereto as at 14 and secured axially thereon by a combined locking stud and starting crank member 15. The member 13 is provided with a cylindrical surface 16 bounded at one end by an annular radially extending shoulder 17. A member 18, in the present instance serving the additional purpose of a pulley for driving a fan or other engine accessory, is shouldered as at 19 so as to be received and centered on the surface 16, and is provided with an annular radially extending shoulder 20 located in axially spaced and opposed relation to the shoulder 17. The member 18 may be rigidly secured to the crankshaft 10 by means of screws such as 21 threaded into the end portion thereof.

Rotatably received upon the cylindrical surface 16 between the shoulders 17 and 20 are two annular weight or mass members 22 and 23 which are provided respectively with inner side surfaces complementary to the shoulders 17 and 20. Annular rings of friction material 24 and 26 are disposed respectively between the shoulder 17 and the member 22 and the shoulder 20 and the member 23. A plurality of opposed blind openings such as 27 are formed in the adjacent faces of the members 22 and 23 and coil springs such as 28, or equivalent means, are received under compression in these openings and consequently constantly urge the members 22 and 23 axially apart so as to cause the members 22 and 23 to be locked for equal rotation with the crankshaft through the intermediary of the friction material 24 and 26.

The construction thus far described is in accordance with conventional practice and as previously described the fit between the members 22 and 23 and the cylindrical surface 16 has in the past, been required to be of extreme accuracy in order to prevent any rattling from occurring at such point, when the damper is actively functioning. In accordance with the present invention the need of an accurate fit at this point without the possibility of rattling developing is eliminated in the following manner. A pin such as 30, lying in axially parallel relation with respect to the crankshaft and adjacent the outer margin of the members 22 and 23, acts to pivotally connect the members 22 and 23 together at this point. At points circumferentially removed from the pin 30, and preferably angularly displaced therefrom with respect to the center of the crankshaft through a distance of ninety degrees, opposed spring pockets 34 and 36 respectively are provided in the adjacent faces of the members 22 and 23 as best illustrated in Figs. 3 and 4. These pockets are similar to the pockets 27 previously referred to except for the fact that where the openings or pockets 27 are axially parallel to the axis of the crankshaft, the pockets 34 and 36 have their axes skewed with respect to the axis of the crankshaft, the angle of the skew of each set of pockets 34 and 36 being such that the springs 38 and 40 respectively received therein under compression combine with each other to tend to urge the masses 22 and 23 in opposite directions of rotation about the axis of the pin 30.

As will be obvious this action of the springs 38 sets up a scissors action of the masses 22 and 23 on the cylindrical surface 16 and acts to resiliently maintain diametrically opposite sides of the bores of the members 22 and 23 against the corresponding sides of the cylindrical surface 16. Accordingly, it will be obvious that regardless of the amount of clearance between the bores of the members 22 and 23 and the surface 16, the springs 38 will constantly maintain one side of the bores in contact with the surface 16 and thereby effectually prevent any movement between these surfaces and consequently any rattling from developing because of such movement.

The springs 38 not only tend to rotate the masses 22 and 23 in opposite directions of rotation with respect to the pin 30 but at the same time exert a component force axially of the crankshaft and in this manner further serve the same purpose as the springs 28 previously described.

Formal changes may be made in the specific embodiment of the invention described without departing from the spirit and substance of the broad invention, the scope of which is commensurate with the appended claims.

What I claim is:

1. In a vibration damper, in combination, a crank shaft, a pair of mass members rotatably supported thereby, energy dissipating means urging said members toward equal rotation with said crank shaft, means eccentric to the axis of rotation of said crank shaft pivotally connecting said members together, and means urging said members toward relatively opposite directions of rotation about said pivotal connection.

2. In a vibration damper, in combination, a crank shaft, a pair of mass members rotatably supported thereby, frictional means urging said members toward equal rotation with said crank shaft, means eccentric to the axis of rotation of said crank shaft pivotally connecting said members together, and resilient means urging said members toward relatively opposite directions of rotation about said pivotal connection.

3. In a vibration damper, in combination, a crank shaft, a supporting part carried thereby, a pair of apertured mass members movably received on said part, frictional means tending to lock said members against movement relative to said crank shaft, a pin pivotally connecting said members together eccentrically of the axis of rotation of said crank shaft, and resilient means urging said members in relatively opposite directions of rotation about said pin.

4. In a vibration damper, in combination, a crank shaft having a cylindrical supporting part, spaced radially extending annular shoulders bounding opposite ends of said part, a pair of apertured mass members rotatably mounted on said part between said shoulders, friction material interposed between each of said members and the corresponding shoulder, resilient means urging said members axially apart, means pivotally connecting said members eccentrically of the axis of rotation of said crank shaft, and means urging said members toward relatively opposite directions of rotation about said pivotal connection.

5. In a vibration damper, in combination, a crank shaft having a cylindrical supporting part, spaced radially extending annular shoulders bounding opposite ends of said part, a pair of apertured mass members rotatably mounted on said part between said shoulders, friction material interposed between each of said members and the corresponding shoulder, means pivotally connecting said members together eccentrically of the axis of rotation of said crank shaft, and resilient means urging said members apart axially and toward relatively opposite directions of rotation about said pivotal connection.

6. The combination of a shaft, a pair of members journaled side by side on said shaft and resilient means acting on said members tending to displace said members laterally of said shaft in substantially opposite directions to cause said members to yieldingly grip said shaft and also urging said members axially relatively to each other.

7. In a vibration damper, in combination, a crank shaft, a pair of associated mass members rotatably associated therewith and resilient means acting on said members tending to displace them laterally of said crank shaft in substantially opposite directions for causing them to yieldingly grip said crank shaft, and friction means between at least one of said members and said crankshaft, said resilient means also urging said one of said members relative to said crankshaft to engage said friction means between them.

FLOYD F. KISHLINE.